United States Patent
Zotov et al.

(10) Patent No.: US 9,996,176 B2
(45) Date of Patent: *Jun. 12, 2018

(54) MULTI-TOUCH USES, GESTURES, AND IMPLEMENTATION

(71) Applicant: Microsoft Technology Licensing, LLC, Redmond, WA (US)

(72) Inventors: Alexander J. Zotov, Redmond, WA (US); Bryan D. Scott, Bothell, WA (US); Reed L. Townsend, Seattle, WA (US); Steven P. Dodge, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/676,633

(22) Filed: Aug. 14, 2017

(65) Prior Publication Data

US 2018/0032168 A1 Feb. 1, 2018

Related U.S. Application Data

(63) Continuation of application No. 14/746,745, filed on Jun. 22, 2015, now Pat. No. 9,811,186, which is a (Continued)

(51) Int. Cl.
*G06F 3/041* (2006.01)
*G06F 3/0488* (2013.01)

(52) U.S. Cl.
CPC ............ *G06F 3/041* (2013.01); *G06F 3/0416* (2013.01); *G06F 3/04883* (2013.01); *G06F 2203/04104* (2013.01); *G06F 2203/04808* (2013.01)

(58) Field of Classification Search
CPC . G06F 2203/04104; G06F 2203/04808; G06F 3/041; G06F 3/0416; G06F 3/04883
See application file for complete search history.

(56) References Cited

U.S. PATENT DOCUMENTS

| 5,483,261 A | 1/1996 | Yasutake |
| 5,694,150 A | 12/1997 | Sigona et al. |

(Continued)

FOREIGN PATENT DOCUMENTS

| JP | H04294416 A | 10/1992 |
| JP | H08211992 A | 8/1996 |

(Continued)

OTHER PUBLICATIONS

"FingerWorks iGesture Pad (igesturenumpad) Touch Pad: Product Features", Retrieved from «http://www.amazon.com/gp/product/B00013MVT4/103-3590298-6877446?SubscriptionI.FingerworksiGesturepad», Retrieved on Dec. 15, 2005, 2 Pages.
(Continued)

*Primary Examiner* — Insa Sadio
(74) *Attorney, Agent, or Firm* — Arent Fox LLP

(57) ABSTRACT

A tablet PC having an interactive display, which is touchscreen enabled, may be enhanced to provide a user with superior usability and efficiency. A touchscreen device may be configured to receive multiple concurrent touchscreen contacts. The attributes of the multiple concurrent touchscreen contracts may be mapped to operations performed on the computing device. As a result, a user can trigger the execution of the toggle accessibility aid operation and the screen rotation operation with greater convenience. Moreover, the tablet PC may be configured to map an operation to a hand gesture or input.

19 Claims, 7 Drawing Sheets

Related U.S. Application Data continuation of application No. 11/433,643, filed on May 12, 2006, now Pat. No. 9,063,647.

(56) References Cited

U.S. PATENT DOCUMENTS

| | | | |
|---|---|---|---|
| 5,825,352 A | 10/1998 | Bisset et al. | |
| 6,107,997 A | 8/2000 | Ure | |
| 6,271,835 B1 | 8/2001 | Hoeksma | |
| 6,323,846 B1 | 11/2001 | Westerman et al. | |
| 6,570,557 B1 | 5/2003 | Westerman et al. | |
| 6,597,347 B1 | 7/2003 | Yasutake | |
| 6,677,932 B1 | 1/2004 | Westerman | |
| 6,819,312 B2 | 11/2004 | Fish | |
| 9,811,186 B2 | 11/2017 | Zotov et al. | |
| 2002/0097229 A1 | 7/2002 | Rose et al. | |
| 2003/0085882 A1 | 5/2003 | Lu | |
| 2004/0263488 A1 | 12/2004 | Martin | |
| 2005/0052427 A1 | 3/2005 | Wu et al. | |
| 2005/0104867 A1 | 5/2005 | Westerman et al. | |
| 2005/0110769 A1* | 5/2005 | DaCosta | G06F 3/0418 345/173 |
| 2006/0010400 A1 | 1/2006 | Dehlin et al. | |
| 2006/0026521 A1 | 2/2006 | Hotelling et al. | |
| 2006/0026535 A1 | 2/2006 | Hotelling et al. | |
| 2006/0026536 A1* | 2/2006 | Hotelling | G06F 3/0418 715/863 |
| 2006/0097991 A1* | 5/2006 | Hotelling | G06F 3/0416 345/173 |

FOREIGN PATENT DOCUMENTS

| | | | |
|---|---|---|---|
| JP | H1040013 A | 2/1998 | |
| JP | H10289045 A | 10/1998 | |
| JP | H11353069 A | 12/1999 | |
| JP | 2004021933 A | 1/2004 | |
| JP | 2004525675 A | 8/2004 | |
| JP | 2004302802 A | 10/2004 | |
| JP | 2006053678 A | 2/2006 | |
| JP | 2007231109 A | 9/2007 | |
| JP | 2008508601 A | 3/2008 | |
| TW | 200532572 A | 10/2005 | |
| WO | 9718547 A1 | 5/1997 | |
| WO | 0208881 A2 | 1/2002 | |
| WO | 2006020305 A2 | 2/2006 | |

OTHER PUBLICATIONS

"Fujitsu Takamisawa America, Inc.", Retrieved from «http://www.siggraph.org/s2000/exhibition/detail/85.html», Retrieved on Dec. 12, 2005, 1 Page.

"Office Action Issued in European Patent Application No. 07776762.2", dated Jul. 25, 2017, 5 Pages.

"Search Report Issued in European Patent Application No. 07776762.2", dated Dec. 2, 2011, 6 Pages.

"Final Office Action Issued in Korean Patent Application No. 10-2008-7027519", dated Jan. 28, 2014, 16 Pages.

"Notice of Allowance Issued in Korean Patent Application No. 10-2008-7027519", dated Apr. 29, 2014, 3 Pages. (W/o English Translation).

"Office Action Issued in Korean Patent Application No. 10-2008-7027519", dated Jul. 15, 2013, 11 Pages.

Malik, et al., "Interacting with Large Displays from a Distance with Vision-Tracked Multi-Finger Gestural Input", In Proceedings of the 18th Annual ACM Symposium on User Interface Software and Technology, Oct. 23, 2005, 11 Pages.

"Office Action Issued in Korean Patent Application No. 10-2014-7005820", dated Jun. 2, 2014, 14 Pages.

"Office Action Issued in Korean Patent Application No. 10-2014-7005820", dated Oct. 14, 2014, 2 Pages. (W/o English Translation).

"Final Office Action Issued in U.S. Appl. No. 11/433,643", dated Sep. 4, 2009, 12 Pages.

"Final Office Action Issued in U.S. Appl. No. 11/433,643", dated Jan. 20, 2011, 15 Pages.

"Non-Final Office Action Issued in U.S. Appl. No. 11/433,643", dated Apr. 28, 2009, 8 Pages.

"Non-Final Office Action Issued in U.S. Appl. No. 11/433,643", dated Feb. 4, 2010, 17 Pages.

"Non-Final Office Action Issued in U.S. Appl. No. 11/433,643", dated Aug. 5, 2010, 15 Pages.

"Notice of Allowance Issued in U.S. Appl. No. 11/433,643", dated Feb. 27, 2015, 9 Pages.

"Final Office Action Issued in Chinese Patent Application No. 200780016733.2", dated Jun. 4, 2012, 12 Pages.

"First Office Action Issued in Chinese Patent Application No. 200780016733.2", dated Apr. 13, 2010, 19 Pages.

"Office Action Issued in Chinese Patent Application No. 200780016733.2", dated Aug. 13, 2014, 12 Pages.

"Final Office Action Issued in Japanese Patent Application No. 2009-510968", dated Oct. 9, 2012, 3 Pages.

"Office Action Issued in Japanese Patent Application No. 2009-510968", dated Dec. 7, 2011, 2 Pages. (W/o English Translation).

"Notice of Allowance Issued in Japanese Patent Application No. 2013-024299", dated Apr. 7, 2016, 4 Pages.

"Office Action Issued in Japanese Patent Application No. 2013-024299", dated Feb. 10, 2016, 6 Pages.

"Office Action Issued in Japanese Patent Application No. 2013-024299", dated Oct. 21, 2015, 6 Pages.

"Office Action Issued in Japanese Patent Application No. 2013-024299", dated Jul. 14, 2015, 6 Pages.

"Office Action Issued in Japanese Patent Application No. 2013-024299", dated Jul. 15, 2014, 4 Pages.

"Office Action Issued in Japanese Patent Application No. 2013-024299", dated Dec. 19, 2013, 2 Pages. (W/o English Translation).

"Notice of Allowance Issued in Taiwan Patent Application No. 96112772", dated Sep. 16, 2013, 4 Pages.

"Office Action and Search Report Issued in Taiwan Patent Application No. 96112772", dated Apr. 25, 2013, 6 Pages.

Brown, et al., "Windows on Tablets as a Means of Achieving Virtual Input Devices", Retrieved from «https://web.archive.org/web/20050209204015/http://www.billbuxton.com/windows.html», Retrieved on Dec. 15, 2005, 11 Pages.

Everitt, et al., "Spatial Multiplexing to Mediate Direct-Touch Input on Large Displays", Retrieved from «http://www.merl.com/publications/docs/TR2005-002.pdf», Dec. 2005, 5 Pages.

Lee, et al., "A Multi-Touch Three Dimensional Touch-Sensitive Tablet", In Proceedings of the SIGCHI Conference on Human Factors in Computing Systems, Apr. 1, 2005, pp. 21-25.

"International Search Report and Written Opinion Issued in PCT Application No. PCT/US2007/010870", dated Oct. 31, 2007, 7 Pages.

"International Preliminary Report on Patentability Issued in PCT Application No. PCT/US2007/010870", dated: Nov. 27, 2008, 7 Pages.

"Office Action Issued in Malaysian Patent Application No. PI20084045", dated Apr. 15, 2014, 2 Pages.

"Office Action Issued in Malaysian Patent Application No. PI20084045", dated Mar. 15, 2013, 3 Pages.

"Office Action Issued in Malaysian Patent Application No. PI20084045", dated May 29, 2015, 2 Pages.

"Second Office Action Issued in Chinese Patent Application No. 200780016733.2", dated Aug. 10, 2011, 19 Pages.

"Non Final Office Action Issued in U.S. Appl. No. 14/746,745", dated Jan. 11, 2017, 13 Pages.

"Non-Final Office Action Issued in U.S. Appl. No. 14/746,745", dated Jul. 15, 2016, 21 Pages.

"Notice of Allowance Issued in U.S. Appl. No. 14/746,745", dated May 9, 2017, 8 Pages.

"Office Action Issued in Chinese Patent Application No. 200780016733.2", dated Jan. 16, 2015, 17 Pages.

"Notice of Allowance Issued in Japanese Patent Application No. 2009-510968", dated Apr. 10, 2013, 4 Pages.

"Office Action Issued in Thailand Patent Application No. 0701001821", dated Jan. 9, 2018, 3 Pages.

(56) References Cited

OTHER PUBLICATIONS

"Office Action Issued in Malaysian Patent Application No. PI20084045", dated Mar. 15, 2018, 2 Pages.

* cited by examiner

| Input / Gesture | Operation |
|---|---|
| Four fingers and thumb that change positions in a semi-circular path | Screen rotation operation |
| Two fingers | Toggle accessibility aid operation |
| | |
| | |

MULTI-TOUCH USES, GESTURES, AND IMPLEMENTATION

CROSS REFERENCE TO RELATED APPLICATIONS

This application is a continuation of co-pending, commonly owned U.S. patent application Ser. No. 14/746,745, filed Jun. 22, 2015, entitled "MULTI-TOUCH USES, GESTURES, AND IMPLEMENTATION," which is a continuation of commonly owned U.S. patent application Ser. No. 11/433,643, filed May 12, 2006, entitled "MULTI-TOUCH USES, GESTURES, AND IMPLEMENTATION," now U.S. Pat. No. 9,063,647, issued Jun. 23, 2015, the entirety of which is herein incorporated by reference.

BACKGROUND

The interaction between computing devices and users continues to improve as computing platforms become more powerful and able to respond to a user in many new and different ways. A user is no longer required to only type on a keyboard in order to control applications and input data. The development of a graphic user interface system, like that provided by Microsoft Corporation's WINDOWS® operating system, has greatly improved the ease with which a user can interact with a computing device by enabling a user to input actions and make selections in a more natural and intuitive manner. The ease with which a user can input control actions is particularly important in applications where the need to provide input quickly and efficiently is important, e.g., video games, virtual environments, file/folder management, etc. In the past, users typically interacted with virtual environments by manipulating a mouse, joystick, wheel, game pad, track ball, or other user input device to carry out some operations as defined by the software program that produces the virtual environment.

One form of user input employs displays that are responsive to the touch of a user's finger or a stylus. These touch-sensitive devices are becoming more common in computing systems. They are very convenient as they allow a user to make natural gestures familiar to the user in other contexts, such as by entering handwriting using a stylus. Many of these devices also allow input to be provided by non-stylus objects, such as a user's fingertip. Touch-sensitive displays can be pressure activated, respond to electrical capacitance or changes in magnetic field intensity, employ surface acoustic waves, respond to changes in brightness by detecting light or shadow from a finger or object over the display, or respond to other conditions that indicate the location of a finger or stylus on the display. As a result, a user can more directly interact with an application or operating system on a computing device. For example, the user may touch the touch-sensitive display with a single finger to select a virtual object and then drag the selected virtual object to a new position on the touch-sensitive display. The term touchscreen or interactive display device will be used herein to refer to such surfaces, displays, or devices that are configured to detect the touch of a stylus and/or a non-stylus object.

Generally, touch sensitive, capacitive, or electromagnetic sensitive display surfaces lack good imaging resolution, inadequately distinguish shape and orientation of objects, and are deficient in sensing multiple objects in contact with the display surface at one time. Also, a pressure sensitive display surface requires actual contact with the display surface and cannot respond to objects that are in proximity with the display surface. Accordingly, it would be desirable for an interactive display device to respond to specific gestures made with the user's finger(s) or other objects that are detected by the interactive display device.

SUMMARY

An interactive display device for receiving multiple concurrent inputs or gestures from a user in order to execute intuitive or user-configured operations on a computing system is disclosed. In accordance with aspects of the invention, a computing system with a touchscreen device including an interactive display device for performing an operation on the computing system in response to user input or gestures is disclosed. The user input or gestures may be multiple concurrent touchscreen contacts or multiple concurrent touchscreen contacts that change along a generally predefined pattern. In one example, a user may execute a toggle accessibility aid operation on the computing device by using two fingers on the interactive display device. In another example, a user may execute a screen rotation operation moving all four fingers and thumb in a jar lid opening path along the surface of the interactive display device.

Furthermore, a computer-readable medium storing computer-executable instructions for performing aspects of the invention is disclosed. The computer-readable instructions may exist at one or more levels of the computing system, e.g., device driver level, operating system level, application level, or others.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Aspects of the invention are illustrated by way of example and not limited in the accompanying figures in which like reference numerals indicate similar elements and in which:

FIG. 5 diagrams a mapping in memory of user inputs or gestures and their corresponding operations.

DETAILED DESCRIPTION

Aspects of the present invention relate to performing an operation on a computing device, such as a tablet, in response to input or gestures from a user of a touch-sensitive input device. As a versatile input method, touch-sensitive input devices (e.g., touchscreen devices) in accordance with aspects of the invention can perform a variety of tasks including, but not limited to, support for multiple simultaneous touchscreen contacts (i.e., multi-touch support). For example, a computing device equipped with a conventional touchscreen device may provide proper on-screen keyboard support for a user. Meanwhile, multi-touch capabilities allow the user to hold the shift key or another modifier key with one finger while typing with another. Meanwhile, in a collaborative environment, a touchscreen device in accordance with aspects of the invention provides support for concurrent input from multiple users, e.g., in an electronic whiteboard scenario. Furthermore, a touchscreen device in accordance with aspects of the invention provides support for multiple input streams in ISV applications such as graphics applications supporting finger painting.

In accordance with aspects of the invention, a user of a touchscreen device on a computing system may create intuitive gestures or modify existing gestures with multiple fingers, chording (e.g. multi-fingered flicks for secondary actions), or "spiking" (e.g., a finger flick with an immediate opposite finger flick without lifting the finger from the touchscreen device) and preconfigure the system to perform an operation in response to the gesture. For example, a single-fingered flick spiking action may be used for primary actions. For example, a user may toggle visibility or availability of an accessibility aid (e.g., a hover widget, touch pointer, soft keyboard, etc.) in response to a predetermined gesture or input. In another example, a user may change the orientation of viewable objects displayed by the system (e.g., a screen rotation) in response to a predetermined gesture. After review of the entirety disclosed herein, one skilled in the art will appreciate that there are a number of gestures that are intuitive and would translate well to a touchscreen device in accordance with aspects of the invention.

Illustrative Computing Environment

Figure 1:
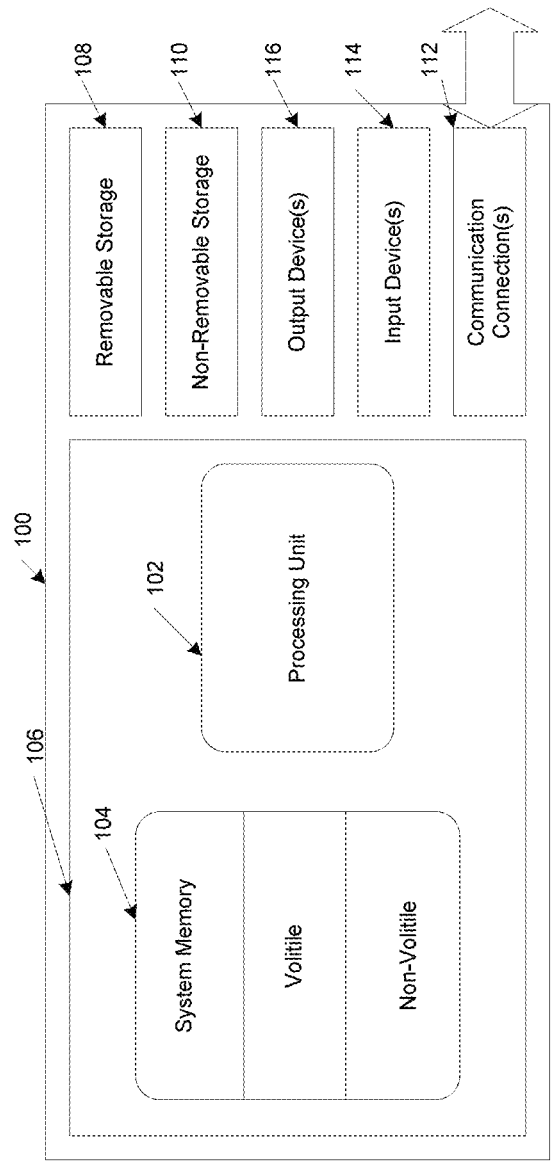
FIG. 1 is an illustrative computing environment in accordance with aspects of the invention.

With reference to FIG. 1, an illustrative system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, touchscreen device, interactive display device, etc. Output device(s) 116 such as a display, speakers, printer, etc. may also be included.

Aspects of the invention may be described in the general context of computer-executable instructions, such as program modules, being executed by a computer. Generally, program modules include routines, programs, objects, components, data structures, etc., that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Figure 2:
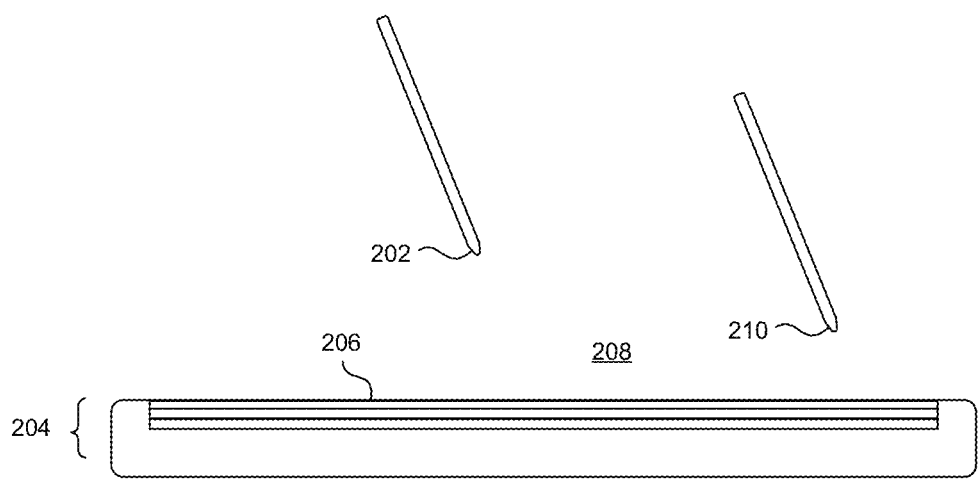
FIG. 2 is an illustrative computing device in accordance with aspects of the invention.

FIG. 2 depicts an illustrative tablet PC 208 that can be used in accordance with various aspects of the invention. Any or all of the features, subsystems, and functions in the system of FIG. 1 can be included in the tablet of FIG. 2. Tablet 208 includes a large display surface 204, e.g., a digitizing flat panel display, preferably, a liquid crystal display (LCD) screen. Using styluses (202, 210), a user can select, highlight, and/or write on the interactive display device screen 204. Additionally, a user's own finger(s) could be the stylus (202, 210) and used for selecting or indicating portions of the displayed image on a touch-sensitive or proximity-sensitive device. Examples of suitable digitizing display surfaces 204 include electromagnetic pen digitizers, such as Mutoh or Wacom pen digitizers. Other types of digitizers, e.g., optical digitizers and capacitive digitizers, may also be used. Tablet 208 interprets gestures made using styluses (202, 210) or the user's hand in order to, among other things, manipulate data, enter text, create drawings, perform preconfigured operations, and/or execute conventional computer application tasks such as spreadsheets, word processing programs, and the like. Region 206 shows a feedback region or contact region permitting the user to determine where the styluses (202, 210) has contacted the display surface 204.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Figure 3:
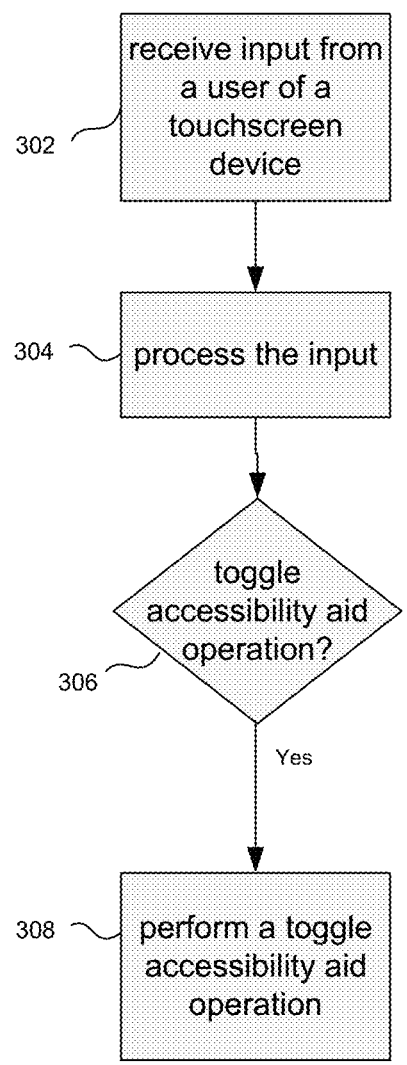
FIG. 3 depicts a flowchart of a user input for performing a toggle accessibility aid operation in accordance with various aspects of the invention.

FIG. 3, in accordance with various aspects of the invention, depicts a flowchart of a computer-implemented method for performing an operation on a computing system in response to input received from a user. In one example, the computing system may be a tablet computer 208. The tablet may be comprised of a touchscreen device including an interactive display device. By way of example, a user of the tablet may use his or her hand to make contact with the touchscreen device to interact, among other things, with the objects displayed on a screen of the interactive display device.

In step 302, the touchscreen device receives input provided by the user. In accordance with aspects of the invention, the user may provide multiple concurrent touchscreen contacts. The input has attributes corresponding to each touchscreen contact. Some examples of attributes of a touchscreen contact include, but are not limited to, the size (e.g., dimensions) of the contact area, absolute position of the contact area, relative position of the contact area (e.g., position relative to other concurrent contacts), amount of pressure provided at the contact area, and other characteristics of inputs for a touchscreen device known to those of skill in the art.

In step 304, the user input is processed in accordance with aspects of the invention. Processing the user input includes, but is not limited to, identifying the attributes of each touchscreen contact and identifying an operation, if any, to perform in response to the input. For example, a computing system in accordance with aspects of the invention may identify multiple concurrent touchscreen contacts at different positions (i.e., locations) on the touchscreen device. By way of example, a first touchscreen contact may be located at an absolute position ten pixels down and forty pixels to the right of the upper-left corner of the touchscreen device. A second touchscreen contact may be located at an absolute position five pixels down and fifty pixels to the right of the upper-left corner of the touchscreen device. In addition, the touchscreen device may identify the dimensions of each of the multiple concurrent touchscreen contacts.

In accordance with various aspects of the invention, the computing system (e.g., tablet) may be preconfigured with a mapping between user inputs and operations that may be performed on the computing system. In the prior example, the attributes of the multiple concurrent touchscreen contacts corresponding to the input indicate that two fingers were used to provide input to the touchscreen device. Assuming the computing system had been preconfigured with a mapping between a toggle accessibility aid operation (e.g., the toggle touch pointer widget operation) and the attributes described above, then the computing system would, in step 306, identify the appropriate operation to perform.

Figure 6:
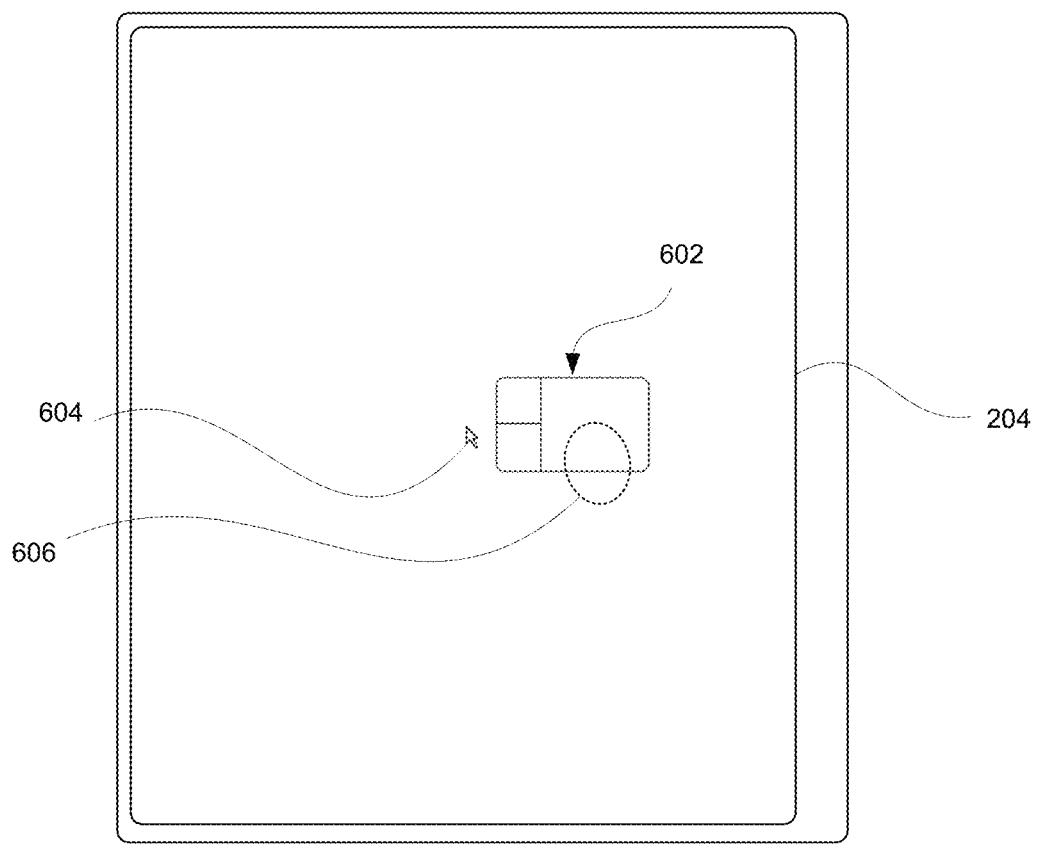
FIG. 6 shows an illustrative screenshot of one example of a screen accessibility aid in accordance with aspects of the invention.
Figure 7:
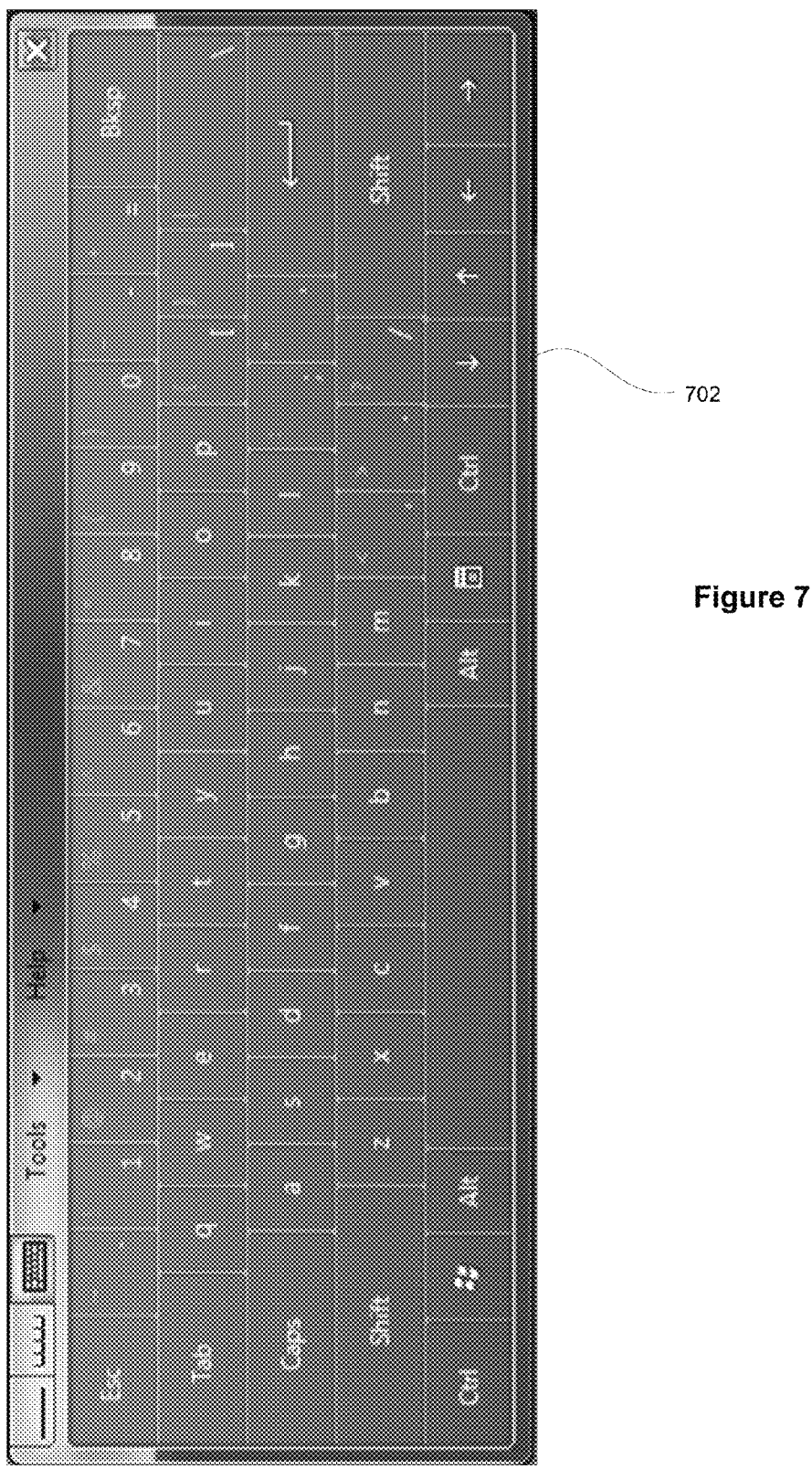
FIG. 7 shows an illustrative screenshot of another example of a screen accessibility aid in accordance with aspects of the invention.

As a result, in step 308, the computing system performs a toggle accessibility aid operation. In the prior example, the input provided by the user indicated that the toggle accessibility aid operation should be performed (in step 308). The toggle accessibility aid operation in this particular example is the toggle touch pointer widget operation, which results in the toggling of the visibility of a touch pointer widget on the interactive display device. A user may use a touch pointer widget, which is similar to a virtual mouse pointer, to more precisely designate a position on the screen of the interactive display device, as illustrated in FIG. 6. Another example of a toggle accessibility aid operation is the toggle soft keyboard operation, which results in the toggling of the visibility of a soft keyboard widget on the interactive display device. FIG. 7 shows an illustrative depiction of the soft keyboard widget 702 on an interactive display device. A user may type or tap on the soft keyboard widget 702 to create inputs similar to a conventional keyboard. Other examples of accessibility aids are screen readers, magnifiers, and other widgets known to those of skill in the art.

Referring to FIG. 6, the touch pointer widget 602 is a graphical depiction adjacent to or surrounding a pointer (e.g., a mouse cursor 604). By placing a finger on the area (e.g., area 606) represented by the touch pointer widget 602 and dragging, the user may manipulate the pointer 604 in a more precise manner then may be possible with a relatively blunt finger. As can be appreciated, the touch pointer widget 602 depicted in FIG. 6 resembles a conventional mouse. While other designs may provide improved interface, an advantage of such a conventional shape such as the mouse is that it is more intuitive for the user as most users are familiar with using a mouse to move a cursor. The user may also press the left and right button so as to simulate a right or left button press on a mouse.

Continuing with the prior example, assuming the touch pointer widget 602 was previously invisible, the user may instruct the computing device to toggle the visibility of the touch pointer widget (i.e., make the touch pointer widget visible) by tapping the interactive display surface 204 of the touchscreen device with two fingers, e.g., the pointer finger and middle finger. In response, the computing system will perform the preconfigured operation.

Although the prior example preconfigured a two finger concurrent touchscreen device input to correspond to the toggle touch pointer widget operation, one skilled in the art will appreciate that an input consisting of any number of fingers may be mapped to the operation. Moreover, variations in other attributes of the touchscreen contacts (e.g., amount of pressure at the touchscreen contact area) may be used to designate other operations. For example, an input from a user using two fingers with only slight pressure at the touchscreen contact area may be preconfigured to the toggle touch pointer widget operation, and an input from a user using two fingers with heavy pressure at the touchscreen contact area may be preconfigured to another operation, e.g., a toggle soft keyboard widget operation.

Figure 4:
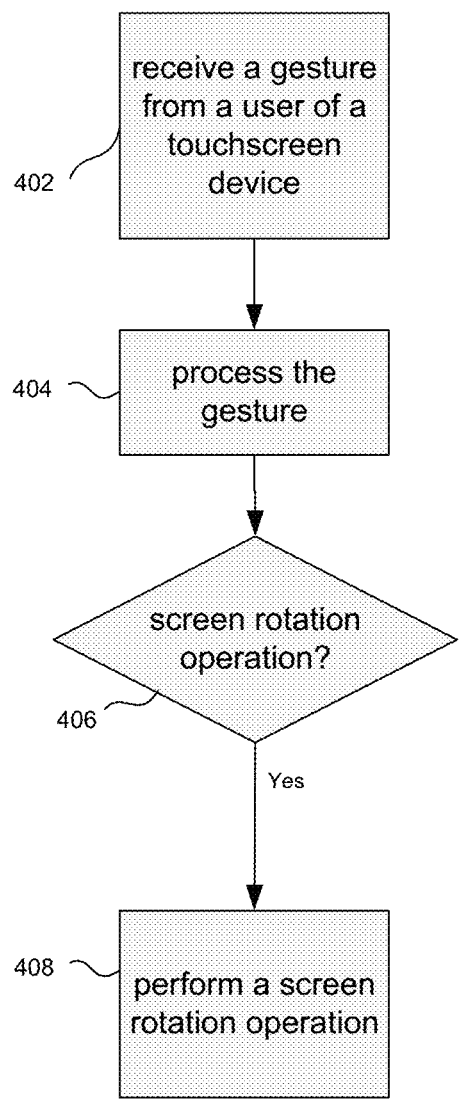
FIG. 4 depicts a flowchart of a user gesture for performing a screen rotation operation in accordance with various aspects of the invention.

FIG. 4, in accordance with various aspects of the invention, depicts a flowchart of a computer-implemented method for performing an operation on a computing system in response to a gesture received from a user. In one example, the computing system may be a tablet computer. The tablet may be comprised of a touchscreen device including an interactive display device. By way of example, a user of the tablet may use his or her hand to make contact with the touchscreen device to interact, among other things, with the objects displayed on a screen of the interactive display device.

In step 402, the touchscreen device receives a gesture from a user of the computing system. In accordance with aspects of the invention, the gesture may be comprised of multiple concurrent touchscreen contacts that change along a generally predefined pattern. Some examples of attributes of a touchscreen contact include, but are not limited to, the size (e.g., dimensions) of the contact area, absolute position of the contact area, relative position of the contact area (e.g., position relative to other concurrent contacts), amount of pressure provided at the contact area, and other characteristics of inputs for a touchscreen device known to those of skill in the art.

In step 404, the gesture is processed in accordance with aspects of the invention. Processing the gesture includes, but is not limited to, identifying the attributes of each concurrent touchscreen contact and identifying an operation, if any, to perform in response to the gesture. For example, a computing system in accordance with aspects of the invention may identify multiple concurrent touchscreen contacts at different positions (i.e., locations) on the touchscreen device. A first, second, third, and fourth concurrent touchscreen contact may be located in a semi-circular pattern on the touchscreen device. A fifth and final concurrent touchscreen contact may be located in a relative position below the semi-circular pattern formed by the first, second, third, and fourth touchscreen contacts. In addition, the touchscreen device may identify other attributes of the multiple concurrent touchscreen contacts for use in identifying a corresponding preconfigured operation to execute. In addition, any changes in the attributes of the concurrent multiple touchscreen contacts may be monitored to identify any predefined patterns. For example, a change in the positions of the multiple concurrent touchscreen contacts in a generally semi-circular path along the surface of the touchscreen device may indicate that the user desires to perform the screen rotation operation, while a change in position in a generally linear path could alternately be mapped to a scrolling or panning operation.

In accordance with various aspects of the invention, the computing system (e.g., tablet) may be preconfigured with a mapping between gestures and operations that may be performed on the computing system. In the prior example, the attributes of the multiple concurrent touchscreen contacts corresponding to the gesture indicate that four fingers and a thumb were used on the touchscreen device. In addition, the multiple concurrent touchscreen contacts were moved in a generally semi-circular path along the touchscreen device surface, similar to a jar lid opening motion. Assuming the computing system had been preconfigured with a mapping between the screen rotation operation (e.g., tablet screen rotation operation) and the attributes described above, then the computing system would, in step 406, identify the appropriate operation to perform.

As a result, in step 408, the computing system performs a screen rotation operation. In the prior example, the gesture provided by the user indicated that the screen rotation operation should be performed (in step 408). The screen rotation operation results in all viewable objects (e.g., icons, wallpapers, taskbar, dialog boxes, etc.) displayed on the interactive display device to be rotated by a predetermined angle, e.g., ninety degrees. The screen rotation operation in accordance with aspects of the invention may be particularly advantageous for a tablet user that chooses to easily switch his or her tablet between a landscape and portrait orientation. In this example, the user may simply touch the interactive display screen with all four fingers and thumb placed in a circular formation (e.g., as if grasping a jar lid) and rotate his or her hand along the surface of the screen. In response, the computing system will perform the preconfigured operation (i.e., the screen rotation operation).

Although the prior example preconfigured a four fingers and thumb gesture to correspond to the screen rotation operation, one skilled in the art will appreciate that a gesture consisting of only two or more fingers and/or no thumb may be mapped to the operation. Moreover, variations in other attributes of the touchscreen contacts (e.g., amount of pressure at the touchscreen contact area) may be used to designate other operations. In addition, one skilled in the art will appreciate that the predetermined angle by which viewable objects are rotated may vary according to the needs of the user and/or system. For example, in one embodiment in accordance with aspects of the invention, the predetermined angle may be determined at the time of the multiple concurrent touchscreen contacts by the amount of circular rotation performed in the user's gesture. Furthermore, in some examples the screen rotation operation may be used to rotate a selected object on the interactive display device, for example, in a computer graphics or drawing program.

After review of the entirety disclosed herein, one skilled in the art will appreciate that in accordance with aspects of the invention, the execution of any operation may be preconfigured in response to a user-defined input or gesture. For example, the window resize operation may be mapped to a user concurrently using two fingers on a window object in an interactive display device. The user may use the two fingers to conveniently resize and/or position the window or control box as desired. In another example, a user may use two fingers to select items (e.g., file icons, folder icons, etc.) displayed in an interactive display device, while using the second finger to add or delete items from the list of selected items. These operations are similar to traditional ctrl-clicking operations, but enhance usability and user efficiency. In yet another example, a computing device may be preconfigured to allow a user's pinching gesture to zoom in and out. Furthermore, a "finger roll" gesture (i.e., contact with the touchscreen device beginning with the pinky finger, then ring finger, then middle finger, followed by the index finger and then the thumb) may be designated for an alt-tab or other sorting/selecting operation.

In accordance with various aspects of the invention, the computing system (e.g., tablet 208) may be preconfigured with a mapping between inputs/gestures and operations that may be performed on the computing system. FIG. 5 diagrams an illustrative mapping 500 stored in the computing system 100 for preconfiguring user inputs/gestures to operations. In a prior example, a gesture 502 using four fingers and a thumb that change positions in a generally semi-circular path on a touchscreen device was preconfigured to correspond to the screen rotation operation 504. Likewise, in a prior example, a user input 506 using two fingers on a touchscreen device was preconfigured to correspond to the toggle accessibility aid operation 508. Assuming a computing system in accordance with aspects of the invention had been preconfigured with a mapping between the operations and the concurrent touchscreen contact attributes described above, then the computing system would identify the appropriate operation to perform.

In accordance with various aspects of the invention, the computer-executable instructions for identifying an operation to perform on the computing system in response to a preconfigured user input or gesture may be stored in a computer-readable medium in the computing system. The computer-executable instructions may be executed at the device driver level, operating system level, application level, or other level.

In one example at the device driver level, frequency characteristics of the touchscreen device may be adjusted to allow for multiple concurrent touchscreen contacts. For instance, a conventional touchscreen device that reports a single touchscreen contact at 133 hertz (hz) may be adjusted to report two concurrent touchscreen contacts at 66 hz each. In another example, three concurrent touchscreen contacts may be reported at 44 hz each. Although this embodiment in accordance with aspects of the invention scaled nicely for varying number of touchscreen contracts, it lowers input resolution by dividing a constant reporting frequency among multiple concurrent touchscreen contacts.

In another example at the device driver level, the size of the packets provided by the touchscreen device are increased to accommodate multiple concurrent touchscreen contacts. For example, instead of reporting a single touchscreen contract's worth of information (e.g., 1 kilobyte of information) in a given update, the system reports ten concurrent touchscreen contacts in a packet carrying 10 kilobytes of information. The disadvantage of this approach is that unless the user is constantly providing ten concurrent touchscreen contacts, packet size is wasted. Moreover, in some systems the driver is limited to reporting a finite number of concurrent touchscreen contacts. The advantage is the reporting frequency is unaltered, assuming the bus supports the increased packet size.

In yet another example at the device driver level, the touchscreen device may expose two logical devices, one logical device that functions similar to a traditional touchscreen device (e.g., a digitizer that reports a single touchscreen contact) and another logical device that reports full information about multiple concurrent touchscreen contacts. In this example, applications may pull the full information from the device and/or driver with an appropriate request, e.g., a request comprising the number of touchscreen contacts, attributes for a given touchscreen contact, etc. In another example, the full information returned may be an image of the touchscreen contact corresponding to every pixel on the interactive display device screen (e.g., a grey-scale image showing pressure or distance from the device for every pixel). In a variation on the above example, a second logical device may be unnecessary if an additional flag is included to indicate the presence of additional data. An application or operating system may then choose to retrieve the additional data using an IOCTL, for example.

In accordance with various aspects of the invention, algorithms and heuristics may be used to receive and process input and/or gestures. For example, in some examples, applications on the computing device may use palm rejection heuristics to predict when a touchscreen contact should be ignored. For example, if the size attribute of a touchscreen contact is too large (e.g., likely a hand's palm), it may be advantageous to ignore the contact. In another example, an application on the computing device may desire to ignore multiple concurrent contacts altogether. In such an instance, the operating system of the computing device may maintain information about the state of the application and the user. It may also be beneficial in some embodiments of the invention to divide computational logic between the device driver and operating system. One skilled in the art will appreciate that it may be beneficial to track multi-touch contact attributes to, for example, determine when a finger is tapped on the touchscreen repeatedly. A consistent cursor identifier may be assigned to the gesture or input.

In addition, one skilled in the art will appreciate that it may be advantageous to provide an application programmer's interface (API) to interface with and utilize the numerous features and functionality of aspects of the invention. For example, standard notifications, such as Stylus-Down, Packets, and SytlusUp, may be used to request full information about multiple concurrent touchscreen contacts from the operating system. In addition, a set of ready-to-use controls and pre-built plugins for existing platform frameworks (e.g., RealTimeStylus) may be used in a computing system configured in accordance with aspects of the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A computer-readable storage medium having computer-readable instructions stored thereon that, based on execution by at least one physical processing unit of a computing device, the computing device comprising a touchscreen and the touchscreen comprising an interactive display, configure the at least one physical processing unit to:
    based at least on the touchscreen receiving a gesture comprising multiple concurrent touchscreen contacts, process the gesture to identify one or more attributes of individual ones of the multiple concurrent touchscreen contacts;
    based at least on processing the gesture, perform an operation comprising toggling visibility of a touch pointer widget adjacent to or surrounding a pointer element on the interactive display; and
    based at least on the touchscreen receiving an input comprising a touchscreen contact (i) within an area represented by the touch pointer widget on the interactive display and (ii) on a control button of the touch pointer widget, perform a selection operation by the pointer element.

2. The computer-readable storage medium of claim 1, wherein the touch pointer widget includes a virtual mouse pointer.

3. The computer-readable storage medium of claim 1, having instructions that further configure the at least one physical processing unit to store a mapping between the operation and the gesture identifying the one or more attributes.

4. The computer-readable storage medium of claim 1, wherein identifying the one or more attributes of individual ones of the multiple concurrent touchscreen contacts includes:
    determining a contact pressure associated with at least one of the multiple concurrent touchscreen contact;
    comparing the contact pressure with a threshold pressure;
    based at least on comparing the contact pressure with the threshold pressure:
        toggling a visibility of a soft keyboard widget if the contact pressure is greater than the threshold pressure; and
        toggling the visibility of the touch pointer widget if the contact pressure is smaller than the threshold pressure.

5. The computer-readable storage medium of claim 1, having instructions that further configure the at least one physical processing unit to determine whether to ignore the selection operation based on an outcome of computing palm rejection heuristics.

6. The computer-readable storage medium of claim 1, wherein the operation of toggling the visibility of the touch pointer further comprises at least toggling visibility of a soft keyboard widget, toggling visibility of a screen reader, or toggling visibility of a magnifier.

7. The computer-readable storage medium of claim 1, wherein the gesture includes at least one finger and a thumb in contact with the touchscreen.

8. A computing device, comprising:
a memory;
a touchscreen having an interactive display; and
at least one physical processing unit configured to:
 based at least on the touchscreen receiving a gesture comprising multiple concurrent touchscreen contacts, process the gesture to identify one or more attributes of individual ones of the multiple concurrent touchscreen contacts;
 based at least on processing the gesture, perform an operation comprising toggling visibility of a touch pointer widget adjacent to or surrounding a pointer element on the interactive display; and
 based at least on the touchscreen receiving an input comprising a touchscreen contact (i) within an area represented by the touch pointer widget on the interactive display and (ii) on a control button of the touch pointer widget, perform a selection operation by the pointer element.

9. The computing device of claim 8, wherein the touch pointer widget includes a virtual mouse pointer.

10. The computing device of claim 8, wherein the one or more processors are further configured to store, in the memory, a mapping between the operation and the gesture identifying the one or more attributes.

11. The computing device of claim 8, wherein identifying the one or more attributes of individual ones of the multiple concurrent touchscreen contacts includes:
 determining a contact pressure associated with at least one of the multiple concurrent touchscreen contact;
 comparing the contact pressure with a threshold pressure;
 in response to comparing the contact pressure with the threshold pressure:
  toggling a visibility of a soft keyboard widget if the contact pressure is greater than the threshold pressure; and
  toggling the visibility of the touch pointer widget pressure is smaller than the threshold pressure.

12. The computing device of claim 8, wherein the at least one physical processing unit is further configured to determine whether to ignore the selection operation based on an outcome of computing palm rejection heuristics.

13. The computing device of claim 8, wherein the operation of toggling the visibility of the touch pointer further comprises at least toggling visibility of a soft keyboard widget, toggling visibility of a screen reader, or toggling visibility of a magnifier.

14. The computing device of claim 8, wherein the gesture includes at least one finger and a thumb in contact with the touchscreen.

15. A computer-readable storage medium having computer-readable instructions stored thereon that, based on execution by at least one physical processing unit of a computing device, the computing device comprising a touchscreen and the touchscreen comprising an interactive display, configure the at least one physical processing unit to:
 receive a first signal indicating a gesture detected by the touchscreen, wherein the gesture includes multiple concurrent contacts;
 determine, based at least on the first signal, an amount of pressure applied to the touchscreen by the multiple concurrent contacts of the gesture;
 determine whether to perform a first toggling operation or a second toggling operation based at least in part on the amount of pressure applied to the touch screen,
 wherein the first toggling operation includes toggling visibility of a touch pointer widget on the interactive display and the second toggling operation includes toggling visibility of a soft keyboard widget on the interactive display.

16. The computer-readable storage medium of claim 15, wherein the touch pointer widget includes a virtual mouse pointer.

17. The computer-readable storage medium of claim 15, wherein the gesture includes at least one finger and a thumb in contact with the touchscreen.

18. The computer-readable storage medium of claim 15, wherein the first toggling operation or the second toggling operation include at least one of toggling visibility of a touch pointer widget, toggling visibility of a soft keyboard widget, toggling visibility of a screen reader, or toggling visibility of a magnifier.

19. The computer-readable storage medium of claim 15, having instructions that further configure the at least one physical processing unit to store a mapping between the operation and the gesture in a memory.

* * * * *